(12) United States Patent
Nabbefeld (10) Patent No.: US 8,594,700 B2
(45) Date of Patent: Nov. 26, 2013

(54) LOCATION-DETERMINING SYSTEM AND METHOD

(76) Inventor: Jan Nabbefeld, Berlin (DE)

( * ) Notice: Subject to any disclaimer, the term of this patent is extended or adjusted under 35 U.S.C. 154(b) by 0 days.

(21) Appl. No.: 13/577,264

(22) PCT Filed: Apr. 29, 2010

(86) PCT No.: PCT/EP2010/055853
§ 371 (c)(1),
(2), (4) Date: Aug. 20, 2012

(87) PCT Pub. No.: WO2011/095234
PCT Pub. Date: Aug. 11, 2011

(65) Prior Publication Data
US 2012/0309421 A1    Dec. 6, 2012

Related U.S. Application Data

(60) Provisional application No. 61/301,256, filed on Feb. 4, 2010.

(51) Int. Cl.
*H04W 24/00* (2009.01)
*H04W 4/00* (2009.01)
*H04J 3/06* (2006.01)

(52) U.S. Cl.
USPC .................. 455/456.1; 455/434; 370/508

(58) Field of Classification Search
USPC ...................................... 455/456.1
See application file for complete search history.

(56) References Cited

U.S. PATENT DOCUMENTS

| | | | |
|---|---|---|---|
| 2003/0069027 A1* | 4/2003 | Heinonen et al. | 455/456 |
| 2005/0053099 A1* | 3/2005 | Spear et al. | 370/508 |
| 2009/0075651 A1* | 3/2009 | MacNaughtan et al. | 455/434 |

FOREIGN PATENT DOCUMENTS

| | | | |
|---|---|---|---|
| EP | 1304897 A1 | 4/2003 | |
| EP | 1317161 A1 | 6/2003 | |
| EP | 1545145 A1 | 6/2005 | |
| GB | 2432487 A | 5/2007 | |
| WO | WO 01/28272 A1 * | 9/2000 | |
| WO | 2005115040 A1 | 12/2005 | |
| WO | 2007017691 A1 | 2/2007 | |

OTHER PUBLICATIONS

International Search Report issued Nov. 4, 2010 for international Application No. PCT/EP2010/055853.

* cited by examiner

*Primary Examiner* — Ajit Patel
*Assistant Examiner* — Timothy Pham (57) ABSTRACT

A method of determining the location of a mobile device (101) comprising receiving at least one mobile communication operating parameter from the mobile device (101), referring to a database (110) of stored navigation device-derived mobile communication operating parameter data and associated location data, wherein the navigation device-derived mobile communication operating parameter data comprises TA zone data or BTS data, and determining the location of the mobile device from the determined mobile communication operating parameter and the data from the database (110).

4 Claims, 7 Drawing Sheets

LOCATION-DETERMINING SYSTEM AND METHOD

CROSS-REFERENCES TO RELATED APPLICATIONS

This application is the National Stage of International Application No. PCT/EP2010/055853, filed Apr. 29, 2010 and designating the United States. The application claims the benefit of U.S. Provisional Application No. 61/301,256 filed Feb. 4, 2010. The entire contents of both these applications are incorporated herein by reference.

FIELD OF THE INVENTION

The present invention relates generally to a method and system for determining the location of a device, for example a mobile telephone, or for monitoring properties of a mobile network.

BACKGROUND TO THE INVENTION

In operation of mobile telephone networks, signals sent between mobile telephones and base transmission stations (BTSs) include various operating parameters that relates to operation of the mobile telephones, the BTSs, and communication between them.

It is known to determine from measured operating parameters the likely location of a mobile phone and to store data mapping operating parameters to an estimate of location in a database. The database can subsequently be used (for example by a user, network operator or government or other agency) to determine the location of a user's mobile telephone by matching operating data obtained from the user's telephone with operating data stored in the database and determining the location of the mobile telephone from location data associated with the stored operating data. An example of such techniques is described in WO 2007/057594, the content of which is hereby incorporated by reference.

In one example, operating data sent between a BTS and a mobile phone includes timing advance zone (TA zone) information that identifies in which TA zone the mobile phone is located. Usually TA zones are arranged as concentric rings, or circumferential sections of such rings (also referred to as slices) of increasing distance from the BTS. For example, in some known systems each TA zone has a radial thickness of 550 m. By determining which TA zone a mobile phone is in, or by monitoring transitions from one TA zone to another, the location of the user can be estimated. Alternatively, the relative signal strengths received by a mobile telephone from different BTSs can be used to determine an estimate of the location of the mobile telephone.

However, the building and maintenance of databases of mobile network operating data and associated location data that can be used to estimate locations of mobile users is time consuming and costly. Furthermore, the accuracy of the location determination depends on the accuracy with which the mobile phone operating parameters can be used to estimate location.

Known systems for monitoring the performance of mobile networks can provide information concerning the variation of measured mobile phone operating parameters with direct measurements of location. For example in the TEMs system, data for each geographical area is obtained by an operator who drives a vehicle fitted with a custom system comprising a mobile phone, GPS device and associated laptop computer for logging mobile phone parameters around each road in the area. Such systems are intended primarily to assess mobile network performance, and the use of such systems can be time-consuming and expensive (operator costs can be several hundred pounds per hour or more). Furthermore, measurements must be repeated regularly as network performance and the variation of mobile phone operating parameters with location can vary significantly over time.

In an alternative approach, as described in WO 2007/017691, the content of which is hereby incorporated by reference, a known traffic monitoring system (TMS) is used to provide continuous, accurate locations for vehicles moving on the roads. Many drivers or passengers of such vehicles will carry with them mobile phones that may be (intermittently) active during each journey. As described in WO 2007/017691, mobile phone control parameters observed on the mobile network from the mobile phones carried by the drivers or passengers of the vehicles can be stored within a database, and linked to position data obtained from the traffic monitoring system (for example, a specific RF signal level pattern could be uniquely associated with a specific physical location). This stored information can then be used by comparing the mobile phone control parameters of mobile telephones on a network against the parameters stored in the database.

However, the accuracy of the determination of location of a mobile device using the database is still dependent on the mobile phone parameters chosen and the accuracy with which they can be used to determine location. For example, RF signal level patterns can vary over time and with environmental conditions.

It is an aim of the present invention to provide an improved or at least alternative method or apparatus for determining the location of mobile devices from mobile device operating parameters.

SUMMARY OF THE INVENTION

In a first, independent aspect of the invention there is provided a method of determining the location of a mobile device comprising: receiving at least one mobile communication operating parameter from the mobile device; referring to a database of stored navigation device-derived mobile communication operating parameter data and associated location data, wherein the navigation device-derived mobile communication operating parameter data comprises TA zone data or BTS data; and determining the location of the mobile device from the determined mobile communication operating parameter and the data from the database.

The BTS data may comprise data representing at least one property of the BTS. The BTS data may comprise a BTS or cell identifier.

By associating measured TA zone data and BTS data with measured location data, an accurate representation of the variation of such data with location can be obtained that can be particularly useful in determining the location of mobile devices from their own measured TA zone data or BTS data.

The at least one mobile communication operating parameter data may comprise TA zone data, the database may comprise TA zone form data representative of the shape and/or size of the TA zone, and the method may comprise determining the location of the mobile device from the TA zone data and the TA zone form data.

The TA zone form data may be representative of the size and/or shape of the TA zone. The TA zone shape may be, wholly or partially, a polygonal shape (such as a regular or irregular polygonal shape) and/or a shape with curved edges. The shape may comprise greater than 4 vertices, or greater than 6 vertices or greater than 10 vertices and/or fewer than 30 vertices, fewer than 20 vertices or fewer than 15 vertices. The vertices may be joined by straight or curved lines, and any curved lines may have any suitable curvature.

The TA zone form data may be representative of a fit of TA zone to location, the fit may be obtained from further TA zone data and associated location data received from a plurality of navigation devices, The fit may comprise a fit to a TA zone shape and/or size, for example a fit to a polygonal shape.

It has been realised pursuant to the present claimed invention that TA zones of predetermined fixed shape and size may not accurately represent the actual shapes of TA zones. By determining TA zone shape and size from measured TA data and measured location, a more accurate assessment of TA zone can be provided. That can provide for more accurate determination of mobile devices based on TA data, and can also provide for a more accurate assessment of actual network performance. It has been found for example that TA zone shape can be affected significantly by the presence of buildings or environmental or geographical features (for example hills or mountains). The determining of the shape of a TA zones may comprise altering the shape from an annular shape or annular segment shape.

Determining the location of the mobile device from the determined mobile communication operating parameter and the data from the database may comprise pattern matching a variation of the received mobile communication operating parameter to the stored data.

The method may comprise pattern matching a sequence of cell or BTS changes to the stored data.

The database may comprise a look-up table of navigation device-derived mobile communication operating parameter data.

In a further independent aspect of the invention there is provided a method of monitoring mobile devices, comprising: receiving location data and associated at least one mobile communication operating parameter from each of a plurality of navigation devices wherein the at least one mobile communication operating parameter comprises TA zone data and/or Base Transmission Station (BTS) data; storing the location data and associated mobile communication operating parameter data representative or derived from the at least one mobile communication operating parameter.

The location data and associated mobile communication operating parameter data may be stored in a look-up table. By associating measured TA zone data and BTS data with measured location data, an accurate representation of the variation of such data with location can be obtained that can be particularly useful in subsequently determining the location of mobile devices from their own measured TA zone data or BTS data, or in monitoring network performance.

The method may further comprise determining the shape and/or size of at least one TA zone from the TA zone data.

The method may comprise fitting each TA zone to a shape and/or size based upon the received TA zone data.

The fitting may comprise fitting the boundaries of the or each TA zone to a shape, for example a polygonal shape (such as a regular or irregular polygonal shape) and/or a shape with curved edges. The fit may include varying a number of fitting parameters, for example the number of vertices, the position of the vertices, whether the vertices are joined by straight or curved lines, and the curvature of any curved lines.

The shape may comprise greater than 4 vertices, or greater than 6 vertices or greater than 10 vertices and/or fewer than 30 vertices, fewer than 20 vertices or fewer than 15 vertices. The vertices may be joined by straight or curved lines, and any curved lines may have any suitable curvature.

The mobile fitting may comprise fitting each of a plurality of TA zones to a respective shape so that the shapes of the TA zones together cover substantially the whole of a region. The TA zones may be contiguous and may tile the whole of the region substantially without gaps between the TA zones.

The shape may comprise a polygonal shape.

The BTS data may comprise a BTS identifier or a cell identifier, and the method comprises determining locations at which mobile communication switches from one BTS or cell to another BTS or cell.

It has been found that the switching of communication from one BTS or cell to another BTS or cell can provide a signature that is useful in determining location of a mobile device.

The method may further comprise determining a sequence of switches from a BTS or cell to a further BTS or cell or to a succession of further BTSs or cells, and associating the sequence with a route or part of a route.

The route may be a road or a portion of a road. The sequence of switches can be used as a signature associated with the route or part of a route, which can for example subsequently be used to determine the location of a mobile communication device that experiences a matching sequence of BTS or cell switches.

The method may further comprising determining from the mobile communication operating parameter a location at which a network fault occurs. The network coverage fault may comprise a network outage or a signal strength below a predetermined threshold.

The method may further comprise providing an alarm signal in response to detection of a network fault.

The navigation devices may be portable navigation devices (PNDs).

The storing of the location data and associated mobile communication operating parameter data may comprise storing the location data and the associated mobile communication operating parameter data in a look-up table.

The method may further comprise monitoring mobile network performance by comparing the stored location data and associated mobile communication operating parameter data to cell plan data, and assessing performance in dependence on the comparison.

In another independent aspect of the invention there is provided a navigation device comprising: a mobile communication device operable to provide at least one mobile communication operating parameter comprising TA zone data or BTS data; a satellite location determining sub-system configured to determine the location of the navigation device; a logging module configured to associate the at least one mobile communication operating parameter with a location determined by the location determining sub-system and to log the at least one mobile communication operating parameter and the determined location as log data; and a communication device for providing the logged data to a server.

The logging module may be configured to log location data and associated mobile communication operating parameter data at regular intervals whenever the navigation device is an operational mode in which it regularly determines its location.

The logging module may be configured to determine mobile communication operating parameter data in response to the navigation device determining its location, and for example associating the determined mobile communication operating parameter data with the determined location.

Alternatively or additionally, the logging module may be configured to log location data in response to a change in one or more mobile communication operating parameters, for example a change of predetermined type and/or by a predetermined amount.

The determining of location may be performed using GPS or other satellite-positioning system.

The logging module may be configured to log location data and associated mobile communication operating parameter data in response to a location determined by the navigation device changing by at least a predetermined amount.

In another independent aspect of the invention there is provided a location determining system for determining the location of a mobile device comprising: means for receiving at least one mobile communication operating parameter from the mobile device; a database of stored navigation device-derived mobile communication operating parameter data and associated location data, wherein the navigation device-derived mobile communication operating parameter data comprises TA zone data or BTS data; and a processing resource configured to refer to the database and to determine the location of the mobile device from the determined mobile communication operating parameter and the data from the database.

The processing resource may be configured to determine the location of the mobile device from the determined mobile communication operating parameter and the stored data by pattern matching a variation of the received mobile communication operating parameter to the stored data.

The database may comprise a look-up table of navigation device-derived mobile communication operating parameter data.

In another independent aspect of the invention there is provided a system for monitoring mobile devices, comprising: means for receiving location data and associated at least one mobile communication operating parameter from each of a plurality of navigation devices wherein the at least one mobile communication operating parameter comprises Timing Advance (TA) zone data and/or Base Transmission Station (BTS) data; and means (for example a database) for storing the location data and associated mobile communication operating parameter data representative or derived from the at least one mobile communication operating parameter.

The system may comprise a processing resource configured to determine the shape and/or size of at least one TA zone from the TA zone data.

The processing resource may be configured to fit each TA zone to a shape and/or size based upon the received TA zone data. The shape may comprise a polygonal shape.

The BTS data may comprise a BTS identifier or a cell identifier, and the processing resource may be configured to determine locations at which mobile communication switches from one BTS or cell to another BTS or cell.

The processing resource may be configured to determine a sequence of switches from a BTS or cell to a further BTS or cell or to a succession of further BTSs or cells, and to associate the sequence with a route or part of a route.

The processing resource may be configured to determine from the mobile communication operating parameter a location at which a network fault occurs. The processing resource may be configured to provide an alarm signal in response to detection of a network fault.

The system may comprise a look-up table for storing the location data and the associated mobile communication operating parameter data.

The processing resource may be configured to monitor mobile network performance by comparing the stored location data and associated mobile communication operating parameter data to cell plan data, and assessing performance in dependence on the comparison.

There may also be provided an apparatus or method substantially as described herein with reference to the accompanying drawings.

Any feature in one aspect of the invention may be applied to other aspects of the invention, in any appropriate combination. For example, apparatus features may be applied to method features and vice versa.

DETAILED DESCRIPTION OF EMBODIMENTS

Embodiments of the invention are now described, by way of non-limiting example, and are illustrated in the following figures, in which.

The system described in relation to FIGS. 1 to 9 can be used to populate a database with mobile phone operating parameter data and associated location data obtained from navigation devices, for example navigation devices permanently installed or temporarily mounted in vehicles. The database can subsequently be used to determine the location of mobile devices or in the monitoring or assessment of network performance. Before describing the population and use of the database, some brief description of one example of a navigation device that can be used in connection with the system is provided.

Figure 1:
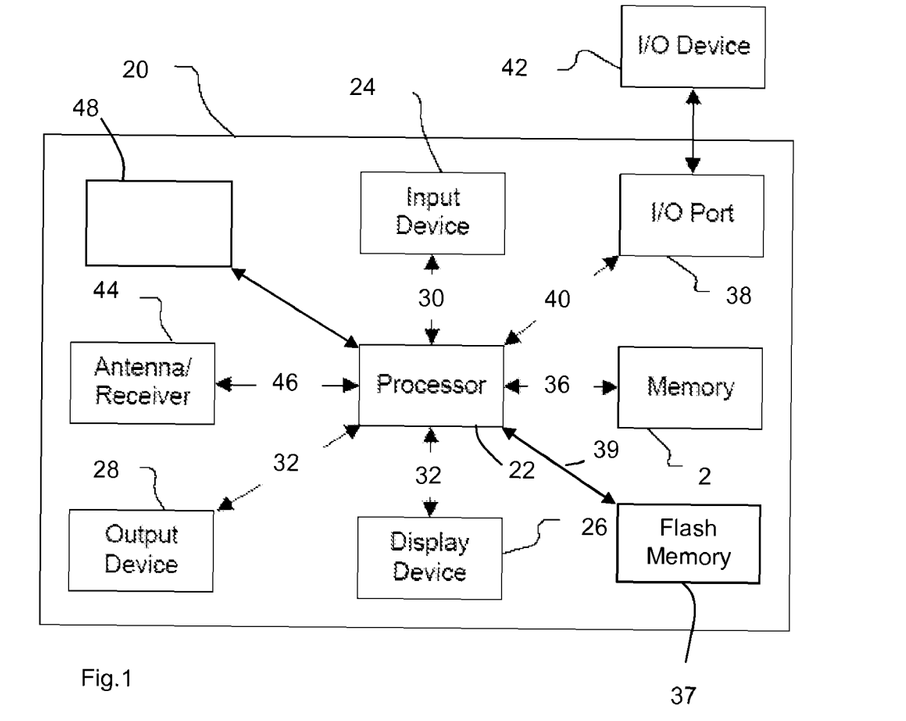
FIG. 1 is a schematic illustration of a navigation device.

A navigation device according to one embodiment is shown in FIG. 1. The navigation device may be permanently installed or temporarily mounted in a vehicle and is able to provide navigation and mapping functions to a user, for example the driver of a vehicle.

The navigation device 20 is located within a housing (not shown). The housing includes a processor 22 connected to an input device 24 and a display screen 26. The input device 24 can include a keyboard device, voice input device, touch panel and/or any other known input device utilised to input information; and the display screen 26 can include any type of display screen such as an LCD display, for example.

The navigation device may include or be connected to an output device 28, for example an audible output device (for example a loudspeaker or vehicle radio).

In the navigation device 20, processor 22 is operatively connected to and set to receive input information from input device 24 via a connection 30, and operatively connected to at least one of display screen 26 and output device 28, via output connections 32, to output information thereto. Further, the processor 22 is operably coupled to the data storage device 2 via connection 36 and to an internal Flash memory 37 via connection 39. The processor 22 is further adapted to receive/ send information from/to input/output (I/O) ports 38 via connection 40, wherein the I/O port 38 is connectible to a further I/O device 42 external to the navigation device 20. The navigation device 20 also comprises a volatile memory (not shown) such as a Random Access Memory (RAM).

The navigation device 20 also includes a GPS antenna/receiver 44, connectable to the processor 20 via connection 46. The antenna/receiver 44 are combined schematically for illustration purposes but may be separately positioned components. The antenna can be, for example, a GPS patch antenna or helical antenna.

The external I/O device 42, which may be a mobile phone for example, and the mobile phone connection may be used to establish a data connection between the navigation device 20 and the internet or any other network for example, and/or to establish a connection to a server via the internet or some other network.

The navigation device 20 also includes its own mobile communication device 48 comprising mobile telephone circuitry within the navigation device 200 itself (including an antenna for example, or optionally using the internal antenna of the navigation device 20). The mobile phone technology within the navigation device 200 can include internal components, and/or can include an insertable card (for example a Subscriber Identity Module (SIM) card), complete with necessary mobile phone technology and/or an antenna for example. The mobile communication device 48 within the navigation device 20 can similarly establish a network connection between the navigation device 20 and the server, via the Internet for example, in a manner similar to that of any suitable mobile device.

Figure 2:
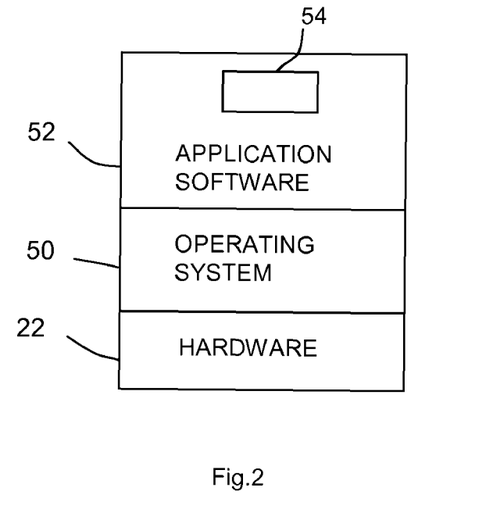
FIG. 2 is a schematic diagram showing the processing architecture of the navigation device in overview.

Referring now to FIG. 2 of the accompanying drawings, the internal flash memory 37 stores a boot loader program that is executable by the processor 22 in order to load an operating system 50 from the internal flash memory 37 for execution by functional hardware components, which provides an environment in which application software 52 can run. The operating system 50 serves to control the functional hardware components and resides between the application software 52 and the functional hardware components. The application software 52 is also stored on the flash memory 37 and provides an operational environment including a GUI that supports core functions of the navigation device 20, for example map viewing, route planning, navigation functions and any other functions associated therewith. The application software also includes an operating parameter logging module 54 that is operable to log mobile phone operating parameters as described in more detail below.

In variants of the described embodiment, the boot loader program, operating system 50 and/or the application software 52 are stored on the data storage device 2, and in some such variants no internal flash memory 37 is included in the device 20.

When the user switches on the device 20, the device 20 acquires a navigation signal. The location is calculated by a position determining module (not shown) included in the application software 52. The user is then presented with a view in pseudo three dimensions on the display 26 of the local environment in which the navigation device 20 is determined to be located, and in a region of the display 26 below or to the side of the local environment a series of control and status messages. The device 20 provides route planning, mapping and navigation functions to the user, in dependence on user input via a keypad (not shown) or other input device.

The navigation device 20 is also able to communicate with a server either via the external mobile phone, the mobile device 48 or via a physical connection to a docking station, or desktop or laptop computer, which in turn is connectable to the server via the internet. Any number of appropriate data communications protocols can be employed for communication between the server and the navigation device 20, for example the TCP/IP layered protocol. In the embodiment of FIG. 1 the mobile device 48 uses the GSM standard to conduct wireless communication with the server via a BTS of a mobile communications network. Any other suitable wireless communication standard can be used in alternative embodiments.

The mobile device 48 included in the navigation device is able to communicate with the server via the mobile communications network for a variety of purposes, for example to obtain traffic information or software updates from the server, or to transmit status or other data to the server.

In accordance with usual GSM techniques, during communication between the mobile device 48 and the BTS, the mobile device 48 and the BTS exchange various mobile communication operating parameters (in addition to any message content, such as message content received from or destined for the server). The mobile communication operating parameters can include, for example, mobile network parameters such as mobile country code (MCC), mobile network code (MNC), location area code (LAC), caller identifier (CID), timing advance (TA) information, and RX/TX signal strength of the current cell. The mobile network communication operating parameters can also include MCC, MNC, LAC, CID, and RX/TX values for up to six neighbouring cells.

In operation, the navigation device periodically (for example, every 5 seconds) obtains a GPS fix and determines its location using known techniques. The determined locations are used in the usual functionality of the navigation device, for example mapping, route planning and navigation, and are also available for use by other components of the navigation device 20.

It is a feature of the described embodiment that the operating parameter logging module 54 is operable to log the mobile communication operating parameters together with a corresponding location determined by the navigation device a time stamp, and store them on the flash memory of the navigation device 20. The logged data can thus be used to determine variations of any of the operating parameters with location or with time.

In one mode of operation, mobile communication operating parameters are received at intervals from the BTS when the mobile device 48 is involved in a communication session (for example during communication between the mobile device 48 and the server or other device, or during a voice call) in accordance with usual GSM procedures. The logging module 54 logs the mobile communication operating parameters as soon as they are received and stores and associates them with the last location determined by the navigation device. In that mode of operation there can be a time lag between the location being determined and the mobile communication operating parameters being obtained and thus in principle there could be a mismatch between the stored location and the location at which the parameters were obtained. However, as the navigation device determines location every few seconds in normal operation, any such time lag or mismatch is usually small. In the first mode of operation, the mobile communication operating parameters are usually obtained only intermittently as they are only obtained when the mobile device 48 is involved in a communication session.

In another mode of operation, the mobile device 48 receives mobile communication operating parameters continuously or periodically from the BTS, (for example during a GPRS (data call) session) regardless of whether the mobile device 48 is involved with a communication session with the server. In that mode of operation, there is no interruption to the receipt of mobile communication operating parameters (unless communication with the BTS is interrupted).

The logging module 54 either stores all mobile communication operating parameters of interest that are received or selects a proportion of them for storage. In one arrangement, the logging module 54 synchronises the logging of data with the determination of position by the navigation device. For example, the logging module can log mobile communication operating parameters immediately in response to a determination of position by the navigation device, to ensure that any time lag or location mismatch between the determined location and the location for which the mobile communication operating parameters are obtained is minimised. In a variation of that approach the logging module 54 and/or the mobile device 48 are operable to synchronise communication with the BTS and the determination of position by navigation device so that any mismatch between a location determined by the navigation device and a location for which mobile communication operating parameters are obtained is minimised. The logging module can also be configured to log mobile communication operating parameter data and corresponding location data in response to a change in one or more mobile communication operating parameters, for example cell, BTS or TA zone change.

The navigation device 20 is operable to upload or otherwise transmit the logged mobile communication parameter operating data and associated location and timestamp data to a server for subsequent processing. The logged data can be uploaded periodically via wireless communication using the mobile device 48 or an external mobile phone, or via a wired connection of the navigation device to a docking station or personal computer for charging or data exchange purposes. The user of the navigation device may be asked for his or her permission to transmit the logged data to the server, and it has been found that most users permit such transmission of logged data. In each case the logged data is usually treated anonymously and cannot be tracked back to a particular user.

Figure 3:
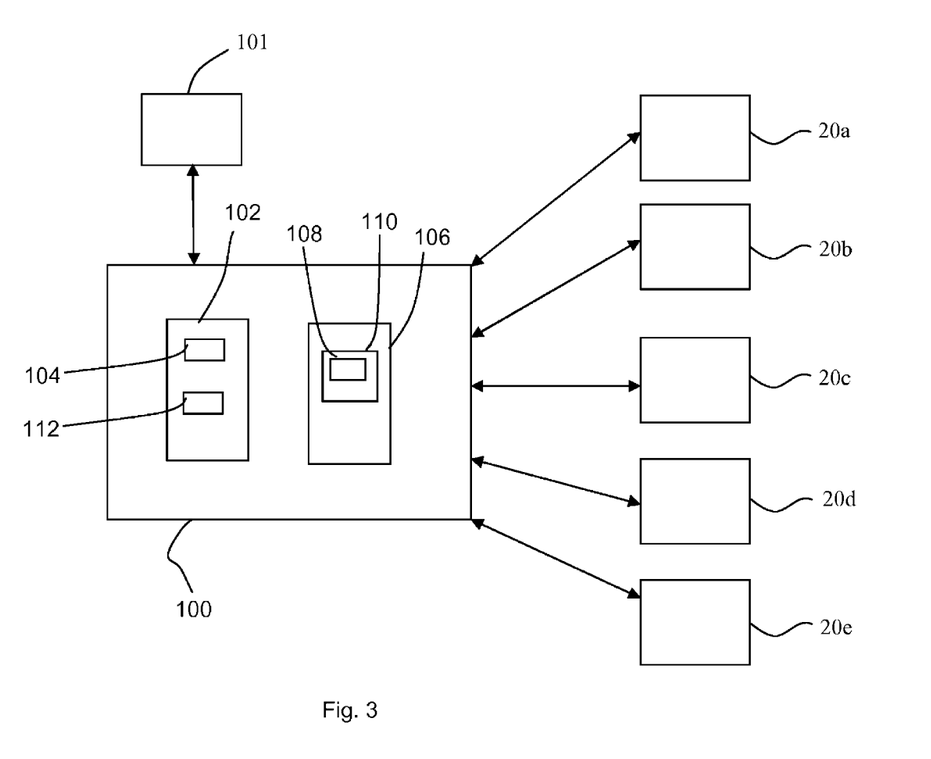
FIG. 3 is a schematic diagram showing several navigation devices in communication with a server.

Many navigation devices can send logged data to the server, as illustrated schematically in FIG. 3, which shows a server 100 in communication with a plurality of navigation devices. Only five navigation devices 20a to 20e are shown for clarity, but it will be understood that in practice many thousands, or more, of navigation devices may be in communication with the server 100. The server is also able to communicate subsequently with a mobile device 101, for example a mobile telephone.

The server 100 includes a processor 102, a mobile parameter processing module 104 for processing location data and mobile phone operating parameter data received from the navigation devices 20a to 20e, and a data store 106 that can be used to store location data and mobile phone operating parameter data. The server 100 may comprise a personal computer, for example a laptop or desktop computer, or may be a larger scale processing resource. It will be understood that the server 100 will usually provide various functions in addition to the storage and processing of logged mobile phone operating parameter data, for example monitoring performance of navigation devices, monitoring travel conditions, providing traffic and other data to navigation devices, and providing software updates to navigation devices. The server includes or is configured to be connected to both wired and wireless communication devices, to provide wired or wireless communication with a variety of devices, for example mobile devices and/or navigation devices using known techniques.

Figure 4:
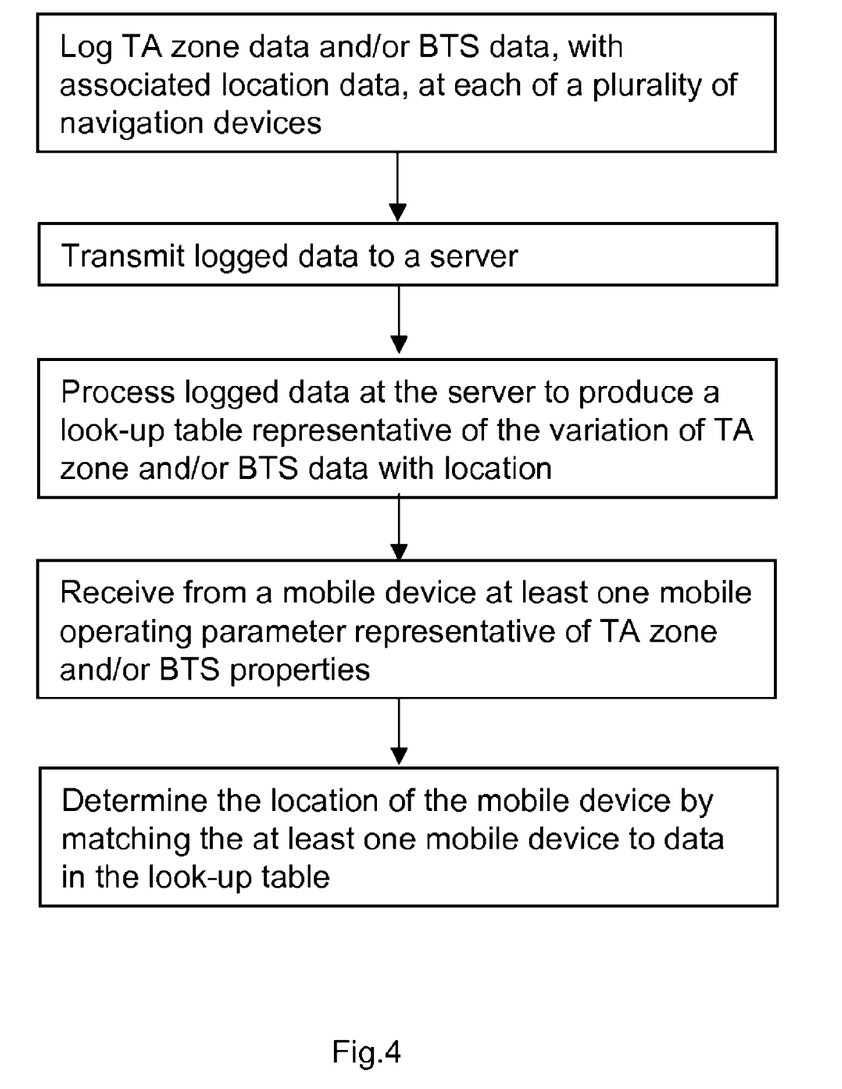
FIG. 4 is a flowchart illustrating a method of determining the location of a mobile device.

One mode of operation of the system of FIG. 3 is illustrated in overview in the flowchart of FIG. 4.

The logged data received from the navigation devices can be used for a variety of applications. In one application, the logged data is processed and a look-up table 108 is generated that maps values of mobile phone operating parameters to location. The look-up table 108 is stored in a measurement database 110. The look-up table 108 can subsequently used by other mobile devices, for example mobile device 101, to determine their location by matching measured mobile operating parameters to values stored in the look-up table 108. The mobile devices may be mobile devices carried by users in vehicles, and in that case the look-up table can be used in traffic monitoring, for example using the TomTom Rodin24 system.

In an embodiment, the server includes a location determining module 112 that, in operation, receives mobile communication operating parameter data from mobile phones or other mobile communication devices, for example mobile device 101. The mobile phone or other mobile communication device does not need to comprise or be associated with a GPS or other location determining apparatus. The location determining module 112 is operable to compare the received mobile communication operating parameter data with the mobile communication operating parameter data and associated location data stored in the look-up table, and determine a location of the mobile phone or other device from the comparison by determining the location that provides the best match with the received mobile communication operating parameters. The location determining module 112 can use, for example, interpolation, extrapolation or pattern matching techniques to determine the match.

In another embodiment, data from the look-up table is provided to a mobile phone or other mobile device, and the mobile phone itself determines its location using the data from the look-up table.

The server 100 can also include or be linked to a traffic monitoring system, which can monitor traffic levels based on the current locations of many mobile telephones or other devices determined by the location determining module 112. The traffic monitoring system can, using known techniques, determine those mobile devices that, from their movement patterns and locations, seem to be in vehicles that are travelling along roads, and can monitor the movement of those mobile devices to determine traffic conditions.

Although a wide range of different mobile communication operating parameters can be obtained and logged using the embodiments described herein, it has been found that some parameters can be particularly useful for subsequent use in position determination or performance monitoring applications.

In one embodiment TA zone information is used in position determination applications. The TA zone information and associated location data received from multiple navigation devices is processed by the mobile parameter processing module 104 to determine the variation of TA zone boundaries with measured location.

The mobile parameter processing module 104 may be configured to fit the boundaries of each TA zone to a shape, for example a polygonal shape (such as a regular or irregular shape) and/or a shape with curved edges. The fit may include varying a number of fitting parameters, for example the number of vertices, the position of the vertices, whether the vertices are joined by straight or curved lines, and the curvature of any curved lines. Any suitable known fitting technique can be used, as will be appreciated by the person skilled in the art. The mobile parameter processing module 104 usually fits each of a plurality of TA zones to a respective shape so that the shapes of the TA zones together cover substantially the whole of a region. The TA zones may be contiguous and may tile the whole of the area.

The mobile parameter processing module can also assign different parts of a road to a different TA zone based on the fitting.

The mobile parameter processing module 104 stores data representing the fitted variation of TA zone with location, and/or data representing the assignment of different parts of a road to a TA zone in the lookup table 108.

Figure 5A:
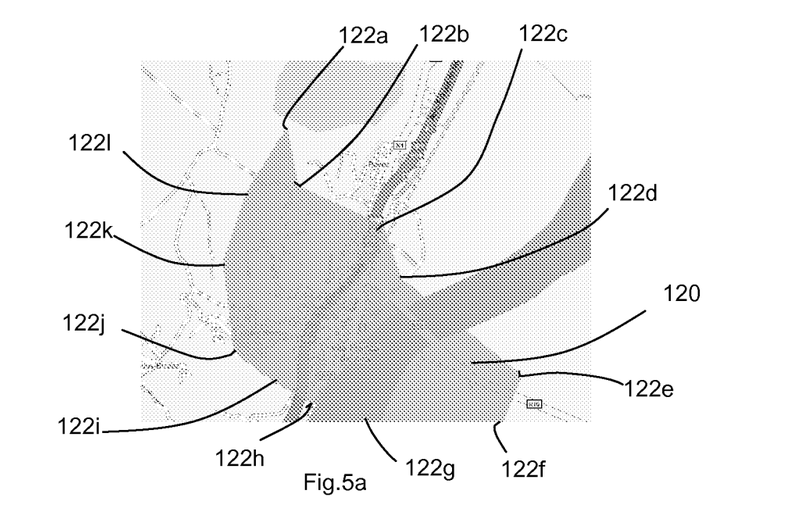
FIG. 5a is an illustration showing a TA zone determined according to one embodiment.
Figure 5B:
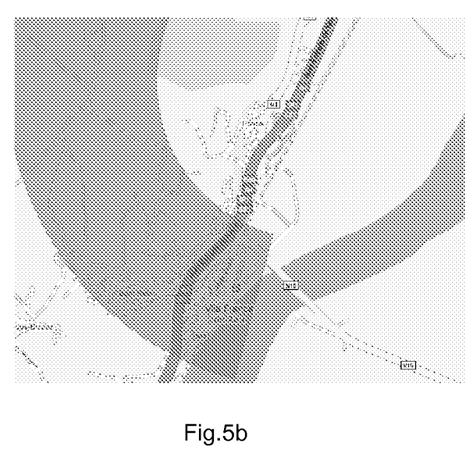
FIGS. 5b and 5c are illustrations showing TA zones determined according to known techniques.
Figure 5C:
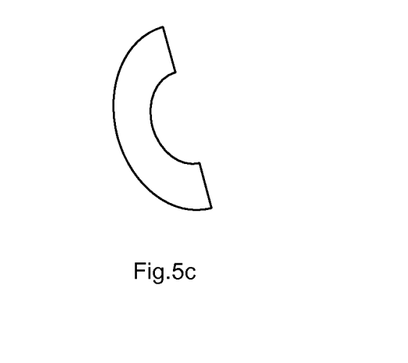
Figure 6A:
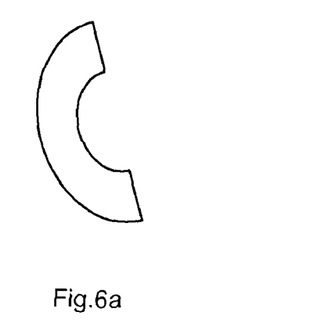
FIGS. 6a to 6f are schematic illustrations showing comparisons between known TA zone shapes and TA zone shapes determined by an embodiment.
Figure 6B:
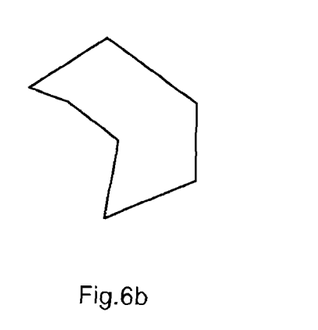
Figure 6C:
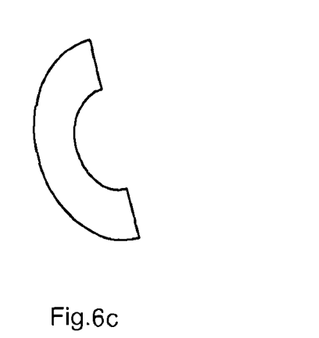
Figure 6D:
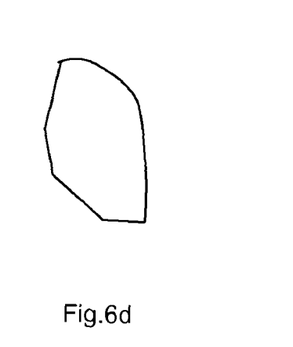
Figure 6E:
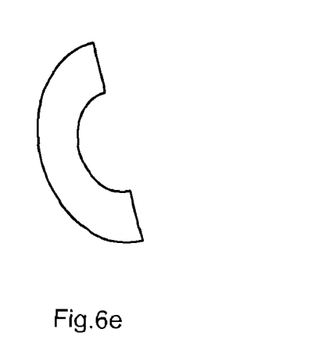
Figure 6F:
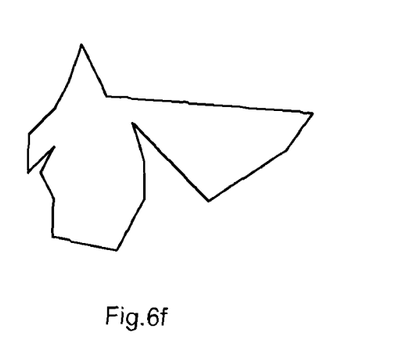

An example of a TA zone fitted by the mobile parameter processing module 104 to a polygonal shape 120 is illustrated in FIG. 5*a*, in which the fitted shape of the TA zone is overlaid on a map. In this case, the TA zone is fitted to a shape that has 12 vertices 122*a*-122*l*, with straight lines joining each of the vertices. In contrast, the shape that would have been presumed for the TA zone of FIG. 5*a* according to previously know techniques is illustrated partially in FIG. 5*b*. FIG. 5*c* is another illustration of the presumed shape of a TA zone according to previously known techniques.

It is a realisation pursuant to the described embodiment that the actual shape of a TA zone can differ significantly from the ring or partial ring shape of fixed dimensions that is presumed in many known systems. The TA parameter at a particular location is usually representative of a measure of the actual time taken for passage of a signal between the mobile device and a BTS and it has been found that, for example, reflections from buildings or other objects or geographical features (for example, mountains, hills and trees) can have a significant effect on the time taken for signals to travel between a BTS and mobile devices. In reality the coverage (and the offset from the centre point) of a TA zone can differ by up to 550 m from the presumed values.

By using the data provided by the navigation device itself the definition of a TA zone shape can be improved. For example, in urban areas most of the actual positions for higher TA zones are not as far away as in non-urban areas. Measurements taken in Switzerland indicate that known TA zone shapes can perform badly.

FIGS. 6*a* to 6*f* show further comparisons between known TA zone shapes (FIGS. 6*a*, 6*c*, 6*e*) that are presumed according to known techniques and corresponding TA zone shapes (FIGS. 6*b*, 6*d*, 6*f*) determined by the mobile parameter processing module 104.

The TA zone data stored in the lookup table can be used by the location determining module 112 to determine the location of a mobile telephone or other mobile device from TA zone data received by the mobile device in operation. For example, in known systems, the position of a mobile handset can be estimated on the basis of a TA zone and/or cell change events. In some such known systems to estimate a position of a handset, an area is calculated and all roads inside of it are assumed to be a possible position. If the handset is moving the number of possible routes will be reduced as more data is received. However, such calculations are usually based on the theoretical coverage of a certain TA zone such as that shown in FIG. 4*b* (a slice or circumferential portion of an annular shape, having a radial width of 550 m). By using the TA zone as defined by the fitting technique implemented by the mobile parameter processing module 104, and this better representative of actual TA zone shapes, the accuracy of such location determining techniques can be improved.

The TA zone information determined by the mobile parameter processing module 104, and comparison with theoretical coverage (for example the previously presumed shape of each TA zone) can also help in tuning BTS characteristics (for example in urban areas in particular) and can also help in detecting parts of a road that may not be covered by any BTS.

As mentioned above logging the TA zone coverage combined with real geo-positions can give the system the possibility to assign parts of a road to a certain TA zone, and data representing the assignation of different parts of roads to different TA zones can be stored in the lookup table. Depending on the number of measurements, pattern matching (for example based on the variation of TA zone, and transition between TA zones, as a function of time) can subsequently provide a reliable estimate of the position of a handset that is moving through and between TA zones.

In related modes of operation, patterns of TA zone or other mobile operating parameter data that occur if a driver gets handed over from one BTS to another while driving can be generated and used. For example, such patterns can be used to determine which road a driver has most probably taken and can be used as a road signature. This kind of fingerprint approach can be expected to work best for major roads in rural environment but can also be helpful in urban areas.

Figure 7:
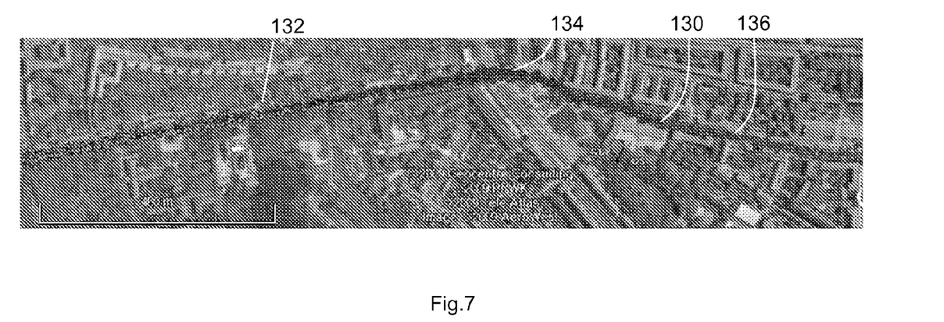
FIGS. 7 to 9 are illustrations showing graphical representations of logged mobile communication operating parameters and location data overlaid on maps.

An example of one such mode of operation is illustrated schematically in FIG. 7. In this example the logged mobile communication operating parameter obtained from each navigation device 20 comprises a GSM cell parameter indicating which cell of the mobile network the mobile device 48 is located. The mobile parameter processing module 104 processes the data received from a mobile device 48, or more usually many different mobile devices, and from the logged GSM cell parameter data and associated location data determines the GSM cells that are used at different locations along a street. In FIG. 7, the different GSM cells used at different locations along a street 130 are indicated by differently coloured circles (blue circles 132, red circles 134 and green circles 136). Data representative of the different GSM cells used in different locations is stored by the mobile parameter processing module 104 in the database 110.

The stored data cell/location data can be subsequently used by the location determining module 112 to determine from cell data received from a mobile telephone or other mobile device the location of the mobile telephone or other device, for example a mobile telephone being used by the driver or passenger of a vehicle as they drive along the street 130. It is very likely that a driver going along the street and having an active voice call will be handed over from one BTS to another in a pattern corresponding to the stored GSM cell data. For example, a driver with a set up voice call following the street 130 from west to east will be handed over from the blue cell to the red cell and finally to the green cell. That pattern (blue, red, green) is likely to be unique for that street 130, and enables the identification of the street by the location determining module 112, which is operable to apply pattern matching techniques to match the observed pattern of cell changes to the stored cell/location data.

The logged data can also be used for other applications in addition to the determination of location of a mobile device. An example of one such application is illustrated with reference to FIG. 8, which shows the variation of mobile phone operating parameters with location along a route 140.

Figure 8:
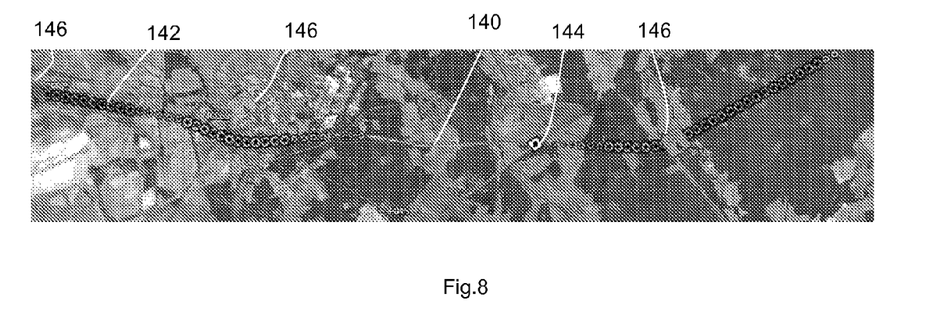

Each stored measurement is represented by a dot 142. The size of the dots represents the Rx level of the signal. BTS coverage is represented by the colour of the dots (a different colour of dot represents a different BTS being used or a different cell). Measurements without GSM coverage (the measurements comprising only geo-positions from the GPS measurements by a navigation device 20) are symbolized by white squares 144. A coloured square represents data for which GSM coverage was available but for which the navigation device 20 was not able to obtain location data via GPRS measurement (for example the navigation device was not attached to the GPRS domain). The position of a BTS (for example, the antenna) is marked by an icon 146.

The visual representation of the mobile operating parameter data, and their variation with location, is obtained using a visualisation module included in the server 100, which provides a set of tools to enable an operator to display the data.

The data represented in FIG. 8 is obtained from a single navigation device 20 during a journey along route 140, and it can be seen that there has been a GPRS outage for part of the journey along the route. In this example, once the navigation device 20 recovered a GPRS signal it transmitted the mobile operating parameter data and location data to the server 100. Either the navigation device 20 or the server 100 identified that there had been a network outage, and either the navigation device 20 or the server 100 provided an alarm signal to indicate that there has been a network outage and the location of the outage. The alarm signal may be transmitted to the network operator. In this case, the mobile parameter processing module 104 did not use the data shown in FIG. 6 to populate the look-up table 108 as the data was not representative of normal operation of the network.

Figure 9:
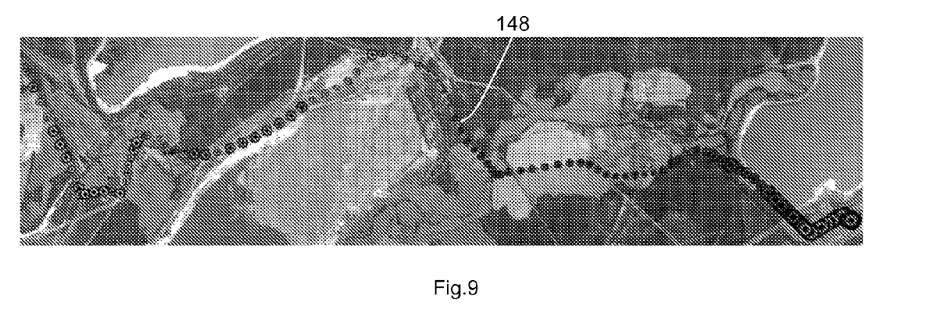

Another example of the use of the mobile phone operating parameter data is illustrated with reference to FIG. 9. Again, measurements along a route 148 are represented by circles, with the strength of the GPS signal represented by the size of the circles. In this example, it can be seen that the logged data gives an impression of the variation of GSM signal strengths during a journey or along a route. The data can be provided to a mobile network operator, who may need to have an overview of the coverage of their network. Areas with lesser signal strength can cause call drops which isn't in the interests of the mobile network operator (or of an operator of the navigation device system). By identifying areas with low signal strength operators can be helped to improve network coverage. Mobile network operators may perform or commission their own test drives, but such test drives are inevitably with a limited number of test drivers. The described embodiment can provide for the supplementing or elimination of such test drives.

Figure 10:
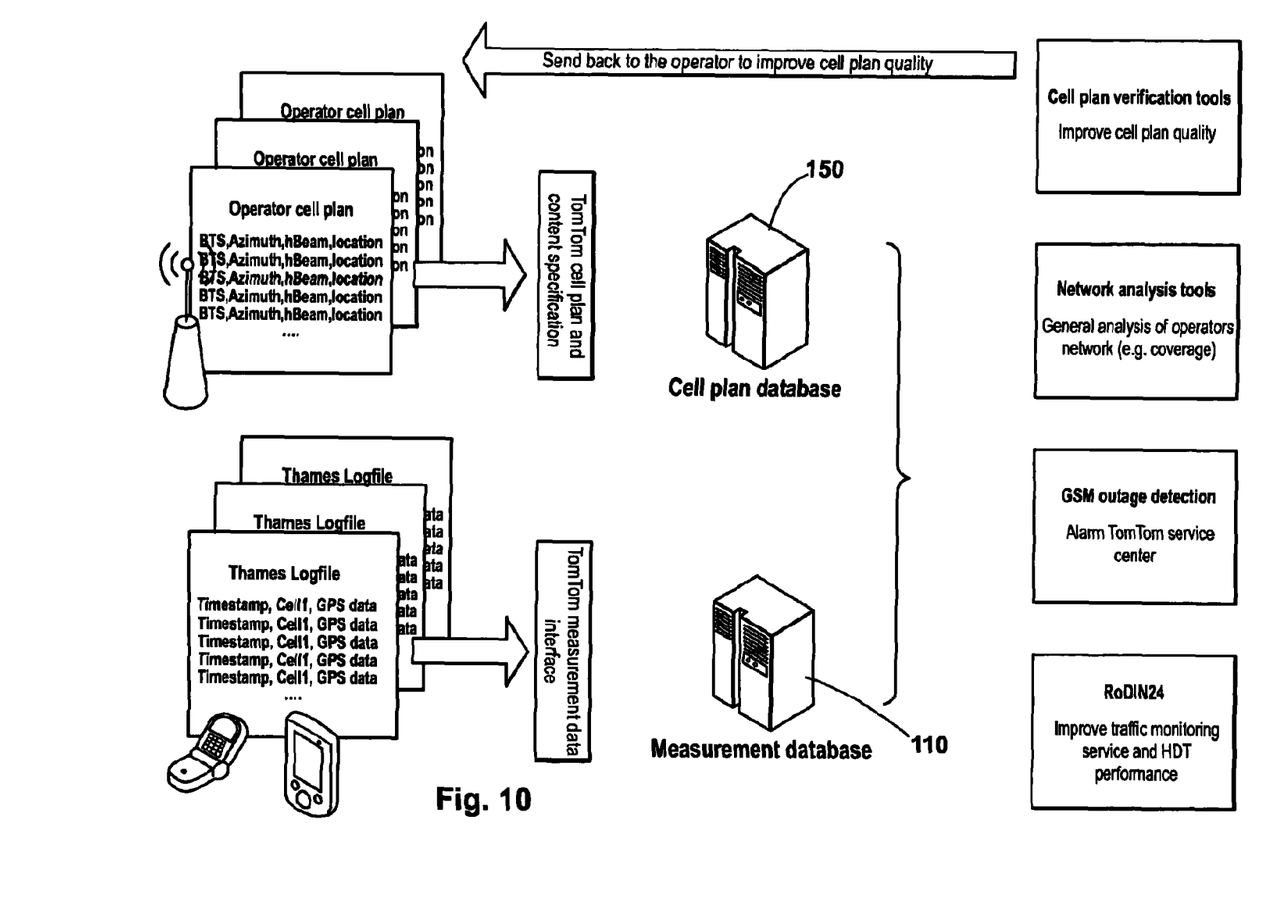
FIG. 10 is a schematic diagram showing in overview a system according to an embodiment.

It will be understood that in some of the applications described above logged data, either before or after processing, or alarm or other signals are sent to a mobile network operator. FIG. 10 is a schematic illustration showing in overview some of the data flows that can occur in operation of the system. In this example, cell plan data representative of a mobile network maintained by an operator (for example, the location and characteristics of BTSs) is stored in a cell plan database 150 at the server 100. Operator cell plan data is obtained and stored in the cell plan database 150.

As already described, logged data is received from many navigation devices (or other GPS-enabled mobile devices) and is stored in the measurement database 110, usually having first been processed by the mobile parameter processing module 104 (which may comprise a measurement data interface). The processor 102 is operable to process the data in the databases 110, 150 and provide applications as already described (for example, cell plan verification, network analysis, GSM outage detection, and improved traffic monitoring. The server 100 is able to communicate with a mobile network operator via an internet or other connection and to provide data or alarm signals as necessary according to the various applications.

The various embodiments described herein can provide for quality control of road GSM coverage, avoiding the need for or supplementing expensive test drives, or for mapping of overall network coverage and signal strength or other network parameters, and for checking the reliability of cell plans provided by mobile network operators. (there are agreed amounts of reliability up to 99.5%). Each driver of a vehicle having a suitable navigation device can effectively become a TEMS-type test driver.

Whilst embodiments described in the foregoing detailed description refer to GPS, it should be noted that the devices and systems may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

Embodiments, or features of such, can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst embodiments implement certain functionality by means of software, that functionality could be implemented solely in hardware (for example by means of one or more ASICs (application specific integrated circuit)) or by a mix of hardware and software. As such, embodiments are not limited only to being implemented in software.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A method of determining the location of a mobile device, comprising:

receiving at least one mobile communication operating parameter from the mobile device, the at least one communication operating parameter comprising Timing Advance (TA) zone data;

referring to a database of stored TA zone data and associated location data, the database further comprising TA zone form data representative of the shape and size of each TA zone, each TA zone having a polygonal shape having greater than 4 vertices, the TA zone form data being derived by processing TA zone data and associated location data received from a plurality of navigation devices; and determining the location of the mobile device from the received at least one mobile communication operating parameter and data retrieved from the database, wherein determining the location of the mobile device from the determined mobile communication operating parameter and the data from the database comprises pattern matching a variation of the received mobile communication operating parameter to the stored data.

2. A non-transitory computer readable medium containing instructions which, when executed on a computer, cause the computer to perform the method of claim 1.

3. A location determining system for determining the location of a mobile device comprising:
- a communications module arranged to receive at least one mobile communication operating parameter from the mobile device, the at least one communication operating parameter comprising Timing Advance (TA) zone data;
- a database of stored TA zone data and associated location data, the database further comprising TA zone form data representative of the shape and size of each TA zone, each TA zone having a polygonal shape having greater than 4 vertices, the TA zone form data being derived by processing TA zone data and associated location data received from a plurality of navigation devices; and
- a processing resource configured to refer to the database and to determine the location of the mobile device from the received at least one mobile communication operating parameter and data retrieved from the database, wherein determining the location of the mobile device from the determined mobile communication operating parameter and the data from the database comprises pattern matching a variation of the received mobile communication operating parameter to the stored data.

4. The location determining system according to claim 3, wherein the communications module is further arranged to receive location data and associated at least one mobile operating parameter from each of a plurality of navigation devices, the at least one mobile communication operating parameter comprising TA zone data, and wherein the processing resource is further arranged to process the received TA zone data and associated location to determine the TA zone form data.

* * * * *